Nov. 24, 1925.
L. C. DANIELS
1,562,870
DIGESTION AND FILTRATION APPARATUS
Filed Jan. 9, 1920
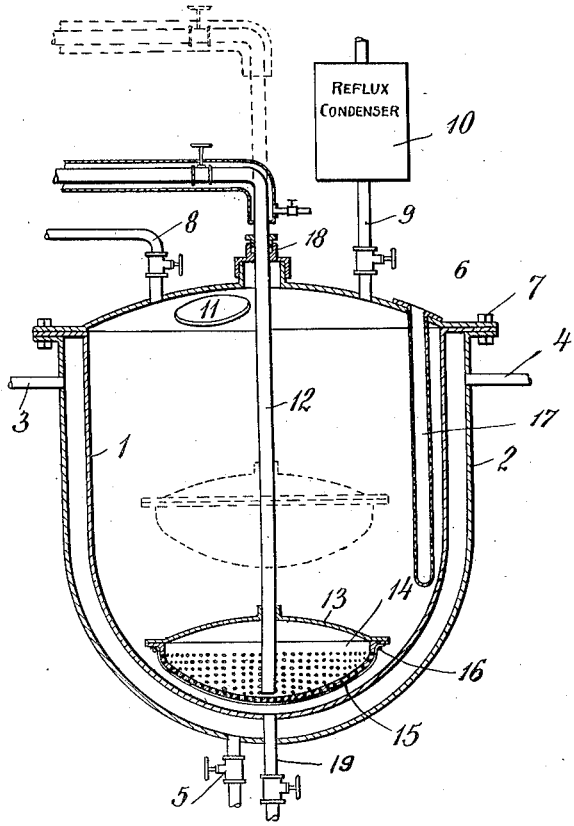
L. C. Daniels. Inventor
By his Attorneys
Pennie Davis Marvin & Edmonds Patented Nov. 24, 1925.

1,562,870

UNITED STATES PATENT OFFICE.

LLOYD C. DANIELS, OF BUFFALO, NEW YORK, ASSIGNOR TO NATIONAL ANILINE & CHEMICAL COMPANY, INC., OF NEW YORK, N. Y., A CORPORATION OF NEW YORK.

DIGESTION AND FILTRATION APPARATUS.

Application filed January 9, 1920. Serial No. 350,334.

*To all whom it may concern:*

Be it known that I, LLOYD C. DANIELS, a citizen of the United States, residing at Buffalo, in the county of Erie, State of New York, have invented certain new and useful Improvements in Digestion and Filtration Apparatus; and I do hereby declare the following to be a full, clear, and exact description of the invention, such as will enable others skilled in the art to which it appertains to make and use the same.

This invention relates to an improved digestion and filtration apparatus intended particularly for use in handling hot solutions, or solutions of inflammable, noxious or irritating materials, for example, solutions in organic solvents of substances which crystallize or separate out from the solvent on cooling.

In extraction and purification processes, it is often of importance to filter hot solutions to free them from undissolved impurities, or to filter hot solutions of impurities to separate them from undissolved substances from which the impurities are being removed by extraction. In a large scale handling of such hot solutions, and particularly where such solutions deposit the solute when cooled only a few degrees, many difficulties are encountered. The chief difficulty thus encountered is the tendency of the solvent to deposit a part of the solute in admixture with the undissolved and unextracted material. Thus, where a hot solution of the extracted material is being separated from undissolved impurities, there is a tendency for the solvent to lose part of the purified material by its being deposited before the filtering operation is completed. Again, in case soluble impurities are being extracted by hot solvents from material being purified, there is a tendency for the impurities to be deposited before completion of the filtering, with resulting contamination of the material being purified. These difficulties are increased in case the solvent forms a solution of steep solubility gradient, such that the dissolved material is in part separated out upon cooling through a small temperature range. Another difficulty that is likely to arise in such cases is that of partial or complete stoppage of the filtering medium or of the flow-pipes by deposition of dissolved solids from the cooled solution passing therethrough.

The present invention provides an improved apparatus which is well adapted for the extraction and purification of various substances by means of hot solvents or extracting agents where it is important to provide for the separation of the hot solution from the undissolved material without objectionable cooling thereof. The invention will be further described in connection with the embodiment illustrated in the accompanying drawing, which shows, in a somewhat conventional and diagrammatic manner, one form of the improved digestion and filtration apparatus in central, vertical section, and with parts in elevation. The nature and objects, as well as the advantages, of the invention will more fully appear from the following more detailed description.

The apparatus illustrated comprises a receptacle or container 1 of suitable size and shape and of material resistant to chemical action by the substances to be used in it. This container or receptacle is shown as having a rounded bottom with a suitable bottom drop or draw-off pipe for draining or discharging the contents thereof. The container or kettle is provided with suitable heating means, preferably with a heating jacket 2 for oil or steam, the inlet and outlet connections being indicated respectively at 3 and 4, and a draw-off for condensed water or for the oil at 5.

The receptacle or kettle 1 is provided with a suitable cover 6, detachably secured thereto by means of bolts or other fastening means 7. This cover has separate pipe connections 8 and 9 with suitable controlling valves, and the pipe 9 is connected with a reflux condenser 10. The cover is also provided with a manhole 11.

Depending through a stuffing box 18 in the center of the cover is the pipe 12 carrying a filter head at its lower end. This filter head, in the form illustrated, is made up of the upper sheet metal member 13 and the lower perforated sheet metal member 14 upon which is secured a layer 15 of a filtering medium, such as a screen or cloth fabric. This filtering layer 15 may be secured in place by a clamping wire 16 or in any other suitable manner. The apparatus is also provided with a thermometer well 17 depending from the cover thereof. It will be understood that the filter head and pipe connections, as well as the receptacle itself, are constructed of suitable material resistant to the chemical action of the materials which are to be handled. The filter head may be packed with granular or powdered filtering material (not shown) and such powdered material may be relied upon in addition to or instead of the filtering screen. Whatever the construction of the filter head, and whether or not it is provided with a covering of the filtering fabric, its bottom curvature should closely approximate the interior bottom shape or curvature of the container.

The pipe 12, outside the container, is provided with a suitable lagging or insulating means to prevent cooling thereof. In the form of apparatus illustrated, this insulating means is in the form of a steam jacket, but it will be understood that other insulating coverings will act in a similar manner to prevent undesirable cooling.

In the operation of the apparatus, the substance to be purified or extracted is charged through the manhole 11, and the solvent or extracting agent is likewise charged through the manhole or through one of the pipe connections. The manhole is then closed, the valve in the pipe 8 is closed, and the apparatus is then heated to the desired temperature by means of the steam or oil jacket, the temperature being measured by the thermometer in the thermometer well 17, or the apparatus is heated to the boiling point of the solvent. With readily volatile solvents, and where the apparatus is heated to their boiling points, the vapor pipe 9 is provided with a reflux condenser to prevent escape of the solvent and provide for returning it to the kettle.

When the solvent has become as nearly saturated as desired, the valve in the pipe 9 is closed and the valve in the pipe 12 is opened. Compressed air or other gas or vapor is then supplied through the pipe 8 and acts upon the surface of the liquid in the apparatus, forcing the solution through the filter head and out of the apparatus through the pipe 12 to a suitable cooling or crystallizing vessel. After cooling and separation of the dissolved material from the solvent, this solvent may be again returned to the apparatus and used for extracting further quantities of material from the residue remaining in the apparatus. After the extraction has been completed, the residue remaining in the apparatus may then be washed out through the bottom discharge pipe 19 with the filtrate or other liquid, and the solvent accompanying the residue may be subsequently recovered by distillation or other appropriate means. Alternatively, the solvent adhering to the residue may be distilled out through the vapor pipe 9 to a condensing system and the residue may then be sludged out through the discharge pipe 19 with water. Where the solvent is to be distilled out through the vapor pipe 9, this distillation may be effected either by heat supplied from the heating jacket, or by the introduction of steam and steam distillation.

The filter head can be cleaned by back washing through the pipe 12. Clogging of the filter head may also be prevented or decreased by gradually lowering the filter head when the filtering operation is to take place. For this purpose the filter head and pipe 12 are vertically adjustable so that they may be raised to a higher position in the apparatus, for example, as indicated in dotted lines. When the filtering operation is to take place, the filter head is gradually lowered by moving the pipe 12 downwardly through the stuffing box 18.

If the filtering medium is to be replaced frequently, the kettle cover should be readily removable, or the opening for the stuffing box should be made sufficiently large to permit withdrawal of the filter head therethrough, or the manhole 11 should be large enough to permit the necessary manipulation through it.

It will be seen that the digestion and filtration operations are carried out without any material change in the temperature of the solution. When the digestion is completed, and the filteration is to take place, the solution, at its existing temperature, is forced through the filter head and outside the apparatus. Cooling of the solution, even through a narrow range of temperature, is thus prevented, and the solution can accordingly be freed from the undissolved residue without redeposition of dissolved constituents by cooling.

The apparatus is also of great advantage for use in handling inflammable, noxious or irritating materials, inasmuch as the apparatus is entirely self-contained and enclosed, and is adapted to handle such materials without exposure of the substances handled until after they have been cooled or chilled. It will be understood that, in practice, the discharge pipe 12 leads to a suitable condenser or cooling apparatus (not shown) for cooling the hot solution and facilitating the deposit of dissolved material therefrom.

The apparatus of the present invention is well adapted for use for the purification of crude benzanthrone with chlorbenzene as a solvent in accordance with the process of my Patent No. 1,365,624. By digesting the crude benzanthrone for a few minutes with the chlorbenzene solvent at the boiling point of the solvent (about 130° C.), and then blowing the solution through the filter head into a cooling receptacle, the benzanthrone can be extracted from insoluble impurities and recovered from the solution by chilling and filtration. The extracting operation can be repeated with the filtrate from the purified benzanthrone until the extraction has been completed; and the residue can then be removed or washed out of the apparatus in the manner above described. The apparatus is also useful for various other purposes, for example, for extracting and purifying acetanilid with hot water as a solvent—a case in which the solubility gradient is very steep.

Where the material being extracted contains tarry impurities, charcoal or other clarifying agents may be introduced into the apparatus with the crude material and solvent, so that such impurities will be held and prevented from being removed with the solution.

It will be noted that the filter head can be moved down practically into contact with the bottom of the kettle and that the lower end of the pipe 12 reaches to practically the bottom of the filter head, so that all of the solution above the lower end of the pipe 12 will be forced through the filter head and out through the pipe 12.

While only one preferred form of the invention has been illustrated, it will be understood that variations and modifications may be made therein without departing from the spirit and scope of the invention.

It will be further understood that fluid pressure is used to force the solution through the filter into the receiver, and such pressure may be of any character and supplied in any desired manner.

I claim:

1. A digestion or extraction and filtration apparatus, comprising a receptacle provided with heating means, a filter head within the receptacle and conforming generally to the contour of the bottom of the receptacle, an outlet pipe leading from within the filter head to the outside of the apparatus, a vapor outlet pipe having a reflux condenser, and means for introducing compressed gas into the receptacle above the liquor level therein to force the liquor out through the filter head and the pipe to the outside of the apparatus.

2. A digestion or extraction and filtration apparatus, comprising a receptacle provided with heating means and having a man-hole and a bottom draw-off passage for discharging the contents thereof, means for measuring the temperature, a reflux condenser, a vertically adjustable filter head within the receptacle, arranged and adapted to permit filtration of substantially all of the liquid contents of the receptacle therethrough, and means for forcing the hot liquor through the filter head to the outside of the apparatus without appreciable cooling of said liquor.

In testimony whereof I affix my signature.

LLOYD C. DANIELS.